Sept. 23, 1941.   M. J. UDY   2,256,536
CONCENTRATING OF CHROMIUM-BEARING ORES
Filed Dec. 8, 1938
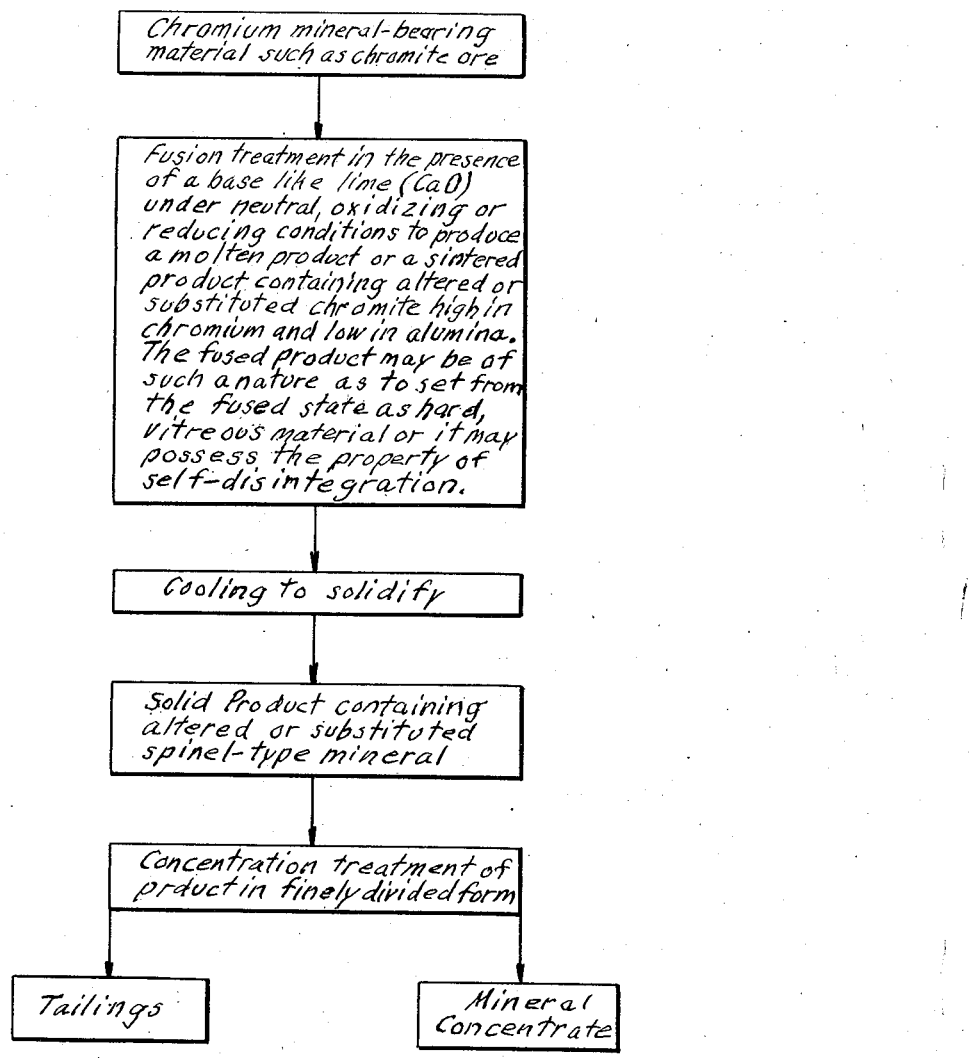
INVENTOR
Marvin J. Udy
BY
Pennie, Davis, Marvin & Edmonds
ATTORNEYS Patented Sept. 23, 1941

2,256,536

UNITED STATES PATENT OFFICE 2,256,536

CONCENTRATING OF CHROMIUM-BEARING ORES

Marvin J. Udy, Niagara Falls, N. Y.

Application December 8, 1938, Serial No. 244,697

14 Claims. (Cl. 75—1)

This invention relates to chromium metallurgy and has for an object the provision of certain improvements in chromium recovery processes. More particularly, the invention contemplates the provision of improved methods of concentrating chromium-bearing materials to obtain products high in chromium and low in iron and products containing relatively small amounts of gangue materials such as alumina and silica. The invention further contemplates the treatment of materials containing spinels comprising ferrous oxide, alumina and chromic oxide to produce altered spinel products containing ferrous oxide and alumina in proportions, relatively to chromic oxide, smaller than in the spinels of the original chromium-bearing material. Another object of the invention is to produce novel and improved chromium-bearing products of the nature of artificial spinel type minerals and altered mineral concentrates. The invention also contemplates the production of improved chromium-bearing materials and improved composite reagents for use in producing ferrochromium and for use in incorporating chromium in iron and steel, the provision of improved methods of producing chromium-bearing materials and improved composite reagents for such uses and the provision of improved methods of producing ferrochromium and chromium-bearing iron and steel products. The invention further contemplates the provision of composite reagents of various compositions suitable for effective and efficient use in operations characterized as to type by performance in electric furnaces, combustion furnaces, foundry ladles, crucibles and other types of equipment.

Certain features of the invention relating to the production and use of composite reagents and the production of ferrochromium and chromium-bearing iron and steel products are described and claimed in my copending application Serial No. 352,746, filed August 15, 1940.

The invention is based on my discovery that chromium-bearing materials of the nature of chromite ore can be made more amenable to treatment for the recovery of the contained chromium in useful form by fusing the ore with lime (CaO, calcium oxide) or magnesia (MgO, magnesium oxide) or a mixture of lime and magnesia in controlled amounts or proportions. I have discovered, also, that additional advantages can be obtained when the chromite ore is fused with lime in amounts such as to produce a fused product having the property or characteristic of self-disintegration upon cooling.

By fusing chromium-bearing materials containing minerals of the spinel type and thereafter subjecting the product of the fusion treatment to a concentration treatment in accordance with the invention, I obtain concentrates comprising altered spinel type minerals which altered minerals contain chromic oxide in greater proportions by weight and chromium and iron in higher ratios of chromium to iron than the spinel type minerals of the original chromium-bearing materials. The altered mineral products of my invention may be sufficiently free of ferrous oxide and alumina to approximate true magnesium chromite in composition or they may contain ferrous oxide and alumina in controlled relatively small amounts. In practicing my invention, I prefer to form and recover altered mineral concentrates containing not less than about fifty percent (50%) by weight of chromic oxide and chromium and iron in proportions to give a ratio of chromium to iron above three to one (3:1). I have produced altered mineral concentrates containing more than sixty percent (60%) and even as high as seventy-eight percent (78%) chromic oxide by weight. All concentrates contained iron and alumina in proportions relatively to chromic oxide lower than contained in the spinel type minerals of the original chromium-bearing materials. Chromite ores constitute the principal raw materials from which chromium is recovered, and, therefore, the invention will be described hereinafter more particularly with reference to the treatment of such ores for the recovery of the altered mineral products and concentrates of the invention.

The altered mineral concentrates obtained in practicing the invention constitute very desirable sources of chromium for industrial uses in which high-chromium sources of chromium are desirable or required. The concentrates are particularly well adapted for use in the production of alloys containing chromium and other metals as, for example, in the production of chromium-bearing iron and steel products. The invention is capable of producing concentrates free of carbon and such concentrates may be employed to great advantage in the production of ferro-chromium and chromium-bearing iron and steel products. I employ the concentrates for producing the composite reagents of my invention which reagents are particularly well adapted for use in producing ferrochromium and in producing chromium-bearing iron and steel products.

The composite reagents of my invention comprise mixtures containing the altered mineral concentrates, or iron and chromium oxide-bearing products resulting from oxidation of the concentrates, and one or more solid, non-carbonaceous reducing agents such, for example, as calcium, aluminum or silicon or an alloy of calcium, aluminum or silicon with one or more other elements: for example, calcium silicide, ferrosilicon, ferrochrome silicon, aluminum silicide or ferroaluminum silicon. The oxide-bearing material and the non-carbonaceous reducing agent preferably are finely divided and intimately mixed. The degree of sub-division and intimacy of mixing in any case will depend to some extent at least on the particular manner in which the composite reagent is to be used. When the heat developed as the result of reaction between the components of a composite reagent is to be relied upon largely or entirely for promoting and continuing the reaction and for melting the reaction products, the degree of sub-division and intimacy of mixing of the components preferably are such that every particle of reducible material contained in the mixture is in direct and substantially complete contact with particles of reducing agent. I have found that such intimate contact requires a degree of comminution such that a large proportion of the oxide-bearing material and the reducing agent consists of particles sufficiently small to pass a 100-mesh screen (Tyler series) and grinding of the materials in contact, or together. When substantial amounts of heat are available, as, for example, when the composite reagents are to be treated in electric furnaces, the components need not be so finely divided and mixing need not be so intimate.

When the composite reagents are to be employed in operations employing electric furnaces where ample supplies of heat are available, the composite reagents may contain the altered mineral concentrate in the unoxidized condition in which it is recovered. When sufficient extraneous heat to effect reduction of the chromium of the concentrate by means of the reducing agent is not available, the concentrate, or a portion of it, preferably is subjected to an oxidation treatment to incorporate oxygen in a form in which it is available for reaction with the reducing agent to supply heat for effecting reduction and melting the products of the reduction reactions.

The products of oxidation are admirably suited for use in forming exothermic mixtures for use in open hearth steel practice. Oxidation is readily controlled to form products containing sufficient oxygen to support combustion of reducing agents, which may be substantially complete if desired. The ferrous oxide of the altered mineral concentrate is converted readily to ferric oxide ($Fe_2O_3$), and oxidation may be so controlled as to convert any desired proportion of the chromic oxide to chromic anhydride ($CrO_3$). Depending upon the conditions under which the various composite reagents are to be employed, they may contain additional oxygen-containing substances to provide additional heat for melting the metal and slag produced.

Any of the common oxidizing agents such, for example, as sodium nitrate, sodium chlorate and manganese dioxide may be employed for promoting oxidation of silicon with the resultant production of additional heat. Such oxidizing agents are required, for example, when the reaction mixtures contain large amounts of inert materials such as slag-forming materials, and they are employed in amounts (together with the necessary reducing agent) sufficient to produce enough heat to melt the metal and slag produced and give the slag the desired fluidity. The addition of such oxidizing agents requires additional silicon, when silicon is employed for reduction, and the total amounts of silicon and available oxygen are so proportioned as to provide about the theoretical amount of silicon for combining with the available oxygen. If excess silicon is used, the excess will enter the metal produced, control of this being effected in the use of reducible materials, high lime slags and high temperatures.

The invention may be employed in the treatment of chromite ores of any grade, but it is of particular importance with respect to the matter of utilizing the so-called low-grade ores, that is, ores containing low percentages of chromium and ores which contain iron and chromium in ratios of iron to chromium too high to permit them to be utilized for the recovery of chromium for industrial uses in processes of the type employed heretofore for chromium recovery. The invention presents a solution of the problem of utilization of such so-called low-grade ores, a solution of major importance to countries requiring chromium for industrial uses, but having available only deposits of low-grade ores. The invention provides a further specific advantage of importance by permitting the use of combustion furnaces in preliminary fusion treatments to condition chromite ores for subsequent concentration treatments with recovery of high grade concentrates.

The chromium of chromite ores usually is present in the spinel type mineral, $MgO.FeO$ ($Cr_2O_3$ $Al_2O_3$), and the gangue materials associated with this mineral in the ore usually contain silica ($SiO_2$), magnesia ($MgO$ and alumina ($Al_2O_3$). I have found that, in some rare instances, notably in some Canadian deposits, magnesia in the ore as mined is present in the gangue materials combined with carbon dioxide as magnesium carbonate, but usually the magnesia of the gangue materials is all or largely combined with the silica and alumina, probably as magnesium-aluminum-silicate.

In the usual chromite ores, the gangue materials are so widely disseminated and so intimately intermixed with the spinels that concentration with recovery of substantially pure spinel particles is virtually impossible. It appears that separation of relatively pure spinel particles, if such separation is at all possible, might require fine grinding of the ore to a degree such as to destroy the properties of the components of the ore by virtue of which they might be selectively separable in known concentration processes. Fusion of the ores in accordance with my invention appears to result in concentration of the spinels into relatively large and relatively pure particles, with increase in specific gravity. The spinels and associated gangue materials are so altered that they may be separated readily by ordinary concentration methods, with the production of tailing products low in chromium oxide and concentrate products high in chromium oxide.

My researches and experiments have indicated that when a chromite ore is fused with lime (calcium oxide) there is a displacement of the magnesia of the silicate portion of chromite ore from its combinations with silica and alumina and displacement, in turn, of the ferrous oxide from the spinel type mineral by the magnesia displaced from its combinations with silica and alumina. It appears, also, that there results a rearrangement of the alumina and silica in the presence of the lime with the production of calcium-aluminum-silicate. The tendency of the alumina ($Al_2O_3$) is to divide between the silicate and chromite portions with a somewhat greater percentage in the silicate. When the lime is present in the charge in amount sufficient to displace all of the magnesia combined with silica or to form dicalcium silicate with the silica present in the charge, the product of the fusion treatment will have the characteristic or property of self-disintegration.

The inclusion of chromium-free acid components such as alumina in charges to be subjected to the fusion treatments of the invention preferably is avoided unless provision is made for preventing introduction of such components into the altered spinel type minerals produced. The preferred charges of the invention (for the fusion treatments) consists of chromite ore and a suitable basic component such as lime. When a disintegrating product is sought, silica may be included if necessary, and, if fractional reduction of displaced ferrous oxide is desired, a reducing agent may be included in the charge to be treated.

Magnesium oxide may be employed instead of calcium oxide to effect direct displacement of the ferrous oxide from the spinel type mineral, but I prefer to employ calcium oxide or calcium oxide and magnesium oxide together, rather than magnesium oxide alone because of advantages in furnace operating characteristics and in the properties of the altered ore resulting from the use of lime (calcium oxide). The invention will be described hereinafter more particularly with respect to the use of lime in the fusion treatment. The lime and magnesia, or either, may be employed as such, that is, as calcium oxide and magnesium oxide, or either or both may be employed in the carbonate or other form which will be converted to the oxide form in the fusion treatment.

Fusion of a charge containing lime and chromite ore may be carried out at a relatively low temperature of incipient fusion at which a product in the form of clinker will be produced, or, fusion of the charge may be carried out at a relatively high temperature at which a product in the form of a molten bath will be produced. Fusion treatments of the invention may be carried out in any suitable type of furnace or heating equipment. For heating charges to temperatures of incipient fusion, I prefer to employ combustion heated furnaces of the type of cement kilns, and, for heating charges to melting temperatures, I prefer to employ the submerged arc type electric furnace.

If the lime is present in the charge in an amount less than or substantially in excess of the amount required to form di-calcium silicate, the product of the fusion treatment may not possess the property of self-distintegration. Also, if the amount of silica present in the charge is not sufficient to permit the formation of a substantial amount of di-calcium silicate, the product of the fusion treatment may not be self-disintegrating, but, on the contrary, may set from the fused state as a hard, vitreous mass when the fusion treatment is carried out at a temperature sufficiently high to form a molten product, or as hard, vitreous clinkers when the fusion treatment is carried out at a relatively low temperature of incipient fusion.

In practicing my invention, I may employ charges of any suitable compositions, and I may produce either disintegrating or non-disintegrating fused products. I prefer to employ charges containing lime and silica in proportions such that self-disintegrating products will result from the fusion treatments. I have found charges made from ore containing about six percent (6%) or more of silica to be satisfactory for producing self-disintegrating products when suitable amounts of lime also are included in the charges. Chromite ores usually contain sufficient silica, but silica may be added to effect the production of self-disintegrating products when ores deficient in silica are undergoing treatment. To insure the production of a disintegrating slag, a charge to be subjected to a fusion treatment should contain a total amount of lime (CaO) or magnesia (MgO) or both at least equivalent molecularly to the chromic oxide ($Cr_2O_3$) of the charge plus an amount of lime (CaO) equivalent to two molecules of lime (CaO) for each molecule of silica in the charge. Usually, the amount of lime included in a charge to be fused should be in excess of the amount theoretically required to produce di-calcium silicate with the silica present when a self-distintegrating product is sought. The necessity for using a charge containing such an excess of lime probably results from the fact that a portion of the lime enters into various combinations with the magnesia, alumina, chromium oxide and ferrous oxide present in the charge and is not available to form di-calcium silicate. Usually, an amount of lime about ten percent (10%) to forty or fifty percent (40 or 50%) in excess of the amount theoretrically required to form di-calcium silicate with the silica in a charge will result in the production of a self-disintegrating product through fusion of the charge. The amount of lime (CaO) which should be present in a charge to produce a self-disintegrating product through fusion can be gauged or estimated roughly as an amount about ten to fifteen percent (10 to 15%) in excess of that equivalent to the ferrous oxide (FeO) in the spinel type mineral of the chromite ore of the charge.

When a charge comprising chromite ore is subjected to a fusion treatment in the presence of lime, the ore is altered or converted from a substantially acid-insoluble product to a product which may be dissolved or broken down with acids, and, according to one aspect of my invention, I utilize the change in susceptibility to attack by acids as an aid to the recovery of high grade concentrates by means of suitable acid treatments. The degree of conversion depends upon the amount of lime employed. With a small amount of lime, the impurities associated with the spinel type mineral of the ore become susceptible to attack by acids, and, as the amount of lime employed is increased, the alumina of the spinel type mineral is displaced or removed and enters into combination with the excess lime. As the amount of lime is increased, there is also a tendency for the chromium oxide to become acid soluble, and, conceivably, the entire chromic oxide content of an ore can be rendered soluble through the use of lime in sufficient quantity. The progressively increasing susceptibility of the ore to attack by acids with increasing solubility of the chromic oxide through the use of progressively increased amounts of lime may be attributed to progressive alteration of the spinel type mineral of the ore with lime first causing (indirectly) displacement of the ferrous oxide, and magnesia substituting for the displaced ferrous oxide, then with alumina being abstracted more and more from the spinel type mineral until the spinel type mineral approaches or reaches the form of a true magnesium chromite (spinel) contaminated to some extent with small amounts of ferrous oxide, calcium chromite and alumina, and, ultimately, with decomposition of the magnesium chromite spinel and the production of mineral bodies of indeterminate compositions. The altered spinel type mineral crystallizes in the fused product in particles of sufficient mass and sufficiently free of contamination with other minerals or compounds contained in the fused product that they may be separated and recovered from such other minerals or compounds by concentration methods employing the principle of separation of virtue of differences in specific gravities (gravity concentration methods, including for example, tabling, hindered settling and hydraulic classification) and by concentration methods employing the principle of separation by virtue of differences in affinities of chemical reagents (flotation concentration methods). The spinels and other minerals and compounds associated therewith in the fused products have different magnetic susceptibilities and, therefore, magnetic separation methods may be adapted for separation and recovery of the spinels.

In preparing chromium-bearing materials by means of fusion treatments for subsequent treatment by concentration methods, it is advisable to employ lime or lime and magnesia in such amounts and proportions as to effect the desired alteration of the spinel with minimum conversion of the chromic oxide to the acid-soluble condition consistent with economical operation under the economic conditions peculiar to the locality in which concentration is to be carried out.

In practicing the invention, fusion of a charge comprising chromite ore and lime may be carried out under neutral, oxidizing or reducing conditions. If fusion of the charge is carried out under controlled reducing conditions, some, or even substantially all, of the iron of the displaced ferrous oxide may be reduced preferentially to the metallic state, leaving a large proportion, or even substantially all, of the chromium unreduced. When the fusion treatment is carried out at a temperature such that the charge becomes molten, the metallic iron and the unreduced chromium will be contained in separable metal and slag layers, respectively, and they may be separated by procedures well known in the metallurgical art. When the fusion treatment is carried out at a relatively low temperature of incipient fusion and under reducing conditions, the metallic iron formed will be distributed in the form of small particles throughout the residual non-metallic material containing the unreduced chromium. Separation of the metal particles from the non-metallic material may be accomplished by any suitable means.

In a preferred process of my invention, I simply heat the charge comprising spinel-bearing material and lime to a temperature of incipient fusion (cement kiln temperatures of about 1350° C. to 1400° C.) under non-reducing conditions to form an altered ore product containing all of the iron and chromium of the original chromium spinel-bearing material. Preferably, the composition of the charge subjected to the fusion treatment is so adjusted that the resulting product is self-disintegrating. The self-disintegrating product of the fusion treatment is digested with acid to dissolve its soluble components, and the insoluble residue is subjected to a gravity or flotation concentration treatment to recover a concentrate containing chromic oxide in higher concentration than in the original ore.

In another preferred process of my invention employing reducing conditions during the fusion treatment, I practice controlled reduction, reducing the major portion of the iron of the displaced ferrous oxide and leaving unreduced the major portion of the chromium of the original ore. I thus obtain a metallic iron product relatively low in chromium and a non-metallic altered ore product beneficiated with respect to chromium by virtue of an increase in the ratio of chromium to iron resulting from the preferential or selective reduction of the iron of the original ore.

In practicing controlled reduction, I prefer to leave unreduced a substantial amount of displaced ferrous oxide, particularly when an acid treatment is to be employed subsequently to decompose the fused product, and I have found that ferrous oxide disseminated throughout the fused material aids in decomposition by acid by permitting penetration of the acid between the grains or crystals of spinel.

When the fusion treatment is carried out at a temperature such that the charge becomes molten, controlled reduction may be practiced by including in the charge the amount of carbonaceous material required to reduce the amount of iron sought to be reduced. When the fusion treatment is carried out at a relatively low temperature of incipient fusion, controlled reduction is rather simple; iron is reduced readily at such low temperatures whereas chromium can not be reduced to any substantial extent at such temperatures.

Controlled reduction may be carried out with any common reducing agent such as solid or gaseous carbonaceous materials, hydrogen, silicon, aluminum or a silicide, or, metallic chromium may be employed as a reducing agent for the ferrous oxide to simultaneously enrich the fused product in chromium. Reduction by means of metallic chromium must be carried out with the metallic chromium and the chromium-bearing material undergoing the reduction treatment in molten condition, and, in this type of operation, a relatively low-grade ferrochromium product may be used advantageously to supply the metallic chromium. Silicon-bearing reducing agents may be employed advantageously for controlled reduction of the displaced ferrous oxide when a self-disintegrating fused product is sought and when the chromium-bearing material undergoing treatment requires additional silica to form the amount of di-calcium silicate required to effect disintegration. When metallic chromium is employed as a reducing agent, the charge composition should be adjusted to include therein sufficient magnesium oxide to combine with the chromic oxide resulting from reduction of the ferrous oxide as well as with the chromic oxide of the chromium-bearing material undergoing treatment. Metallic chromium and elemental silicon may be used together as reducing agents advantageously in the form of ferrochrome silicon which may be produced by fusing the metallic iron product of the controlled reduction operation with coke and silica to reduce the silicon of the silica.

In the foregoing discussion, I have advanced a theory, which seems to be supported by experimental results, in an effort to explain the mechanism of alteration of chromite ore resulting from fusion of the ore with lime, but it is to be understood that I do not wish to be bound or limited by theoretical considerations. The results of my researches and experimentations definitely establish the fact of alterations resulting from fusion of chromite ore with lime. As the result of such fusion treatments, the iron of the ferrous oxide of chromite ore becomes more amenable to selective or preferential reduction by common reducing agents; the chromium of the chromic oxide of chromite ore becomes more readily oxidizable; the ferrous oxide of the chromite ore becomes more susceptible to attack by acids; and the chromic oxide becomes more amenable to recovery by ordinary concentration methods.

In concentrating chromite ore to produce a high-chromium concentrate in accordance with my invention, I may, as indicated above, fuse the ore under such conditions as to produce a self-disintegrating product or under conditions such as to produce a non-disintegrating product, and I may carry out the fusion treatment under reducing conditions to produce a beneficiated altered ore product or under non-reducing conditions to produce merely an altered ore product containing all of the iron and chromium present in the original ore. A self-disintegrating fused product of the invention readily disintegrates to form particles which are largely small enough to pass a 65-mesh screen, and the entire product may be ground readily to form particles small enough to pass a 200-mesh screen.

When a self-disintegrating fused product is produced, I may concentrate by means of acid methods, gravity concentration methods (such as water concentration or air separation) flotation concentration methods or any suitable combination of two or more of such methods. When gravity concentration is employed, I may retreat the concentrate obtained with acid to further eliminate associated gangue materials. When a non-disintegrating product is formed, I may grind the product and subject the ground product to a gravity concentration treatment or to a flotation concentration treatment or both, but I prefer to concentrate the ground product by means of an acid treatment which may be followed by a gravity or flotation concentration treatment.

In processes involving melting of the charges, the original charge materials may be employed in any suitable particle sizes. In processes involving sintering (incipient fusion) of the charges, the charge materials preferably are employed in the form of particles one-quarter inch and smaller in size. When a self-disintegrating product is to be formed by sintering (incipient fusion), I prefer to employ charge materials consisting essentially of particles minus 65-mesh in size or, more desirably, minus 100-mesh in size. If the components of the charge are to be employed in the form of particles of different sizes in the production of self-disintegrating altered ore products by fusion, it is adsivable to employ the lime in the more finely divided condition (smaller particle size). (Screen sizes referred to in this application are based on the Tyler series.)

In treating any of the products of fusion treatments, I may first employ an acid treatment to decompose the fused product and follow this treatment with a gravity or flotation or equivalent concentration treatment to recover a concentrate containing the altered spinel type mineral, or, I may first employ a gravity or flotation or equivalent concentration treatment to recover a concentrate containing the altered spinel type mineral and subsequently subject the concentrate to an acid cleaning or concentrating treatment. Excess acid and dissolved and separated matter may be washed from the residual altered mineral by means of a water treatment or any other suitable treatment.

In treating the products of fusion treatments with acid, and, in cleaning concentrates resulting from various types of concentration treatments, I may employ any suitable acid in any suitable concentration capable of effecting the degree of decomposition sought to be accomplished. I have found hydrochloric acid and sulphuric acid to be entirely suitable for accomplishing effective decomposition of the fused products and concentrates. Aqueous solutions containing about ten to thirty percent (10 to 30%) hydrochloric acid (HCl) or sulphuric acid ($H_2SO_4$) can be employed to produce good results at temperatures ranging from ordinary atmospheric temperatures to boiling temperatures. Sulphuric acid treatments may be followed by roasting or fuming treatments at elevated temperatures to promote more effective decomposition of the fused products or concentrates and subsequently to decompose or break down sulphate compounds produced.

The following examples illustrate the production and recovery of high chromic oxide ($Cr_2O_3$) spinels with low silica and alumina produced by carrying out fusion and concentration treatments in accordance with my invention, employing chromite ore of the following analysis Ore analysis:

|  | Per cent |
|---|---|
| $Cr_2O_3$ | 44.00 |
| FeO | 23.80 |
| $SiO_2$ | 6.20 |
| $Al_2O_3$ | 13.80 |
| MgO | 8.30 |
| CaO | 3.02 |

Example I

A charge of the chromite ore was smelted in an electric furnace with lime sufficient to form a self-disintegrating altered ore and coke sufficient to reduce a portion of the displaced ferrous oxide with the production of a metallic iron product, the altered ore product and the metallic iron product were obtained in the molten state.

The altered ore product produced was separated from the metallic iron and cooled to permit disintegration. The self-disintegrating altered ore was passed through a 65-mesh screen to separate unaltered ore particles and any relatively large metal particles, and the screened product was treated in the form of a pulp with water on a concentrating table to form a tail product and a concentrate. The concentrate was re-treated with sulphuric acid to remove additional gangue materials, and a clean concentrate analyzing as follows was obtained Concentrate:

|  | Per cent |
|---|---|
| FeO | 2.8 |
| CaO | 2.3 |
| MgO | 14.1 |
| $Cr_2O_3$ | 73.0 |
| $Al_2O_3$ | 7.8 |
| $SiO_2$ | Nil. |

Example II

A charge consisting of ore and lime and containing the ore and lime in the proportions, 4 parts of ore to 1 part of lime (CaO), both by weight, was ground to about 100-mesh and heated to incipient fusion in a rotary kiln (at about 1350° C.). The product disintegrated on cooling. The disintegrated product was concentrated by tabling an aqueous pulp of the same, and the concentrate was treated with acid. An altered ore (spinel) of the following analysis was obtained

| | Per cent |
|---|---|
| $Cr_2O_3$ | 68.3 |
| FeO | 7.3 |
| $SiO_2$ | Nil. |
| $Al_2O_3$ | 11.0 |
| CaO | 1.9 |
| MgO | 11.5 |

About 96.5% of the chromium oxide of the original ore was recovered in this product.

Example III

A charge consisting of two parts by weight of ore and one part by weight of lime (CaO) was ground to approximately 100-mesh and sintered at about 1350° C. This product did not disintegrate probably because of insufficient di-calcium silicate. When ground to 100-mesh, concentrated by tabling an aqueous pulp of the same and the concentrate treated with acid, it gave a product of the following analysis which contained 86.5% of the chromium oxide of the original ore

| | Per cent |
|---|---|
| $Cr_2O_3$ | 74.05 |
| FeO | 7.35 |
| $SiO_2$ | 1.10 |
| $Al_2O_3$ | 3.15 |
| CaO | 3.20 |
| MgO | 11.15 |

It will be noted that with the lesser amount of lime less alumina ($Al_2O_3$) was removed, also less soluble $Cr_2O_3$ was formed, while, in the case of more lime, more chromic oxide ($Cr_2O_3$) was rendered soluble, but more alumina ($Al_2O_3$) was removed, and the product approached a pure magnesium chromite with minor quantities of impurities of silica ($SiO_2$), alumina ($Al_2O_3$), lime (CaO) and ferrous oxide (FeO).

In forming the composite reagents of the invention, the altered mineral concentrate (oxidized or unoxidized) and the solid non-carbonaceous reducing agent may be ground separately and mixed together subsequently or the two products may be ground together. I prefer to grind the two products together at least in the preparation of the final composite reagent, as grinding of the two products together results in thorough mixing and aids in coating of the larger particles of each product with the extremely fine particles of the other product, thus producing the most desirable type of intimate contact. Grinding and mixing efficiencies are improved when the solid non-carbonaceous reducing agent is ground preliminarily to a finely divided condition. In employing silicon containing reducing agents, according to my preferred practice, I employ a reducing agent ground initially to such an extent that a large proportion by weight consists of particles small enough to pass a 100-mesh screen.

In the preferred composite reagents of my invention, the major portions (by weight) of the particles of the altered mineral and non-carbonaceous reducing agent combined are small enough to pass a 100-mesh screen. Substantial amounts consist of particles small enough to pass a 150-mesh screen and of particles small enough to pass a 200-mesh screen. Substantially all of the particles may be small enough to pass a 200-mesh screen, and this type of product is most desirable when the composite reagent is to be used for the direct production of a metal product containing iron and chromium in the proportions in which these elements are present in the components of the composite reagent. When the composite reagent is to be employed on the surface of a molten metal bath for incorporating chromium in the metal, such a fine state of division of the components of the composite reagent is not so essential to the securing of good results. Such a fine state of division may be desirable to secure optimum results when the composite reagent is to be employed on the surface of a slag-covered molten bath. A composite reagent having its components in such a fine state of division reacts substantially entirely within itself with a minimum tendency toward reduction of undesirable elements such as phosphorus which may be present in the slag.

The products of my invention may be employed in any suitable manner for producing chromium-bearing alloys. The altered mineral concentrates, for example, may be added to the furnace either alone or in admixture with the reducing agent when reduction is to be carried out in an electric furnace where ample heat is available. When reduction is to be carried out in combustion furnaces or in crucibles, the altered mineral concentrate preferably is mixed intimately with the reducing agent before being charged into the furnace or crucible. The intimate mixture may be employed in a loose condition, or it may be employed in a compact condition, as, for example, in the form of briquettes, or tightly packed in combustible bags or metal containers. In adding the intimate mixture of altered mineral concentrate and reducing agent to a combustion furnace, I prefer to employ it in the form of a compact mass, as in the form of briquettes or agglomerates.

When the composite reagents are to be formed into briquettes or packed in containers, it is desirable to employ particles of different sizes in the ranges 80 to 100 mesh; 100 to 150 mesh; 150 to 200 mesh; and minus 200 mesh. Substantial amounts of the material will consist of particles within these size ranges when grinding is carried out under conditions designed to accomplish reduction in size of about 5 to 10 percent (5 to 10%) of the materials to minus 200 mesh particles. The use of various sized particles provides for an effective degree of interlocking of particles which tends to produce strong briquettes capable of withstanding rough handling in shipping and which also tends to aid in securing the desirable intimate contact of particles of altered mineral concentrate with particles of reducing agent. The use of various sized particles also provides for tight packing of the materials in containers.

In forming composite reagents for use in relatively low-temperature operations, I prefer to subject the altered mineral concentrates, in the solid state, to an oxidizing treatment to break down the chromite and make the chromium more amenable to reduction at such low temperatures. Oxidizing treatments may be carried out advantageously in such cases for the additional purposes of incorporating additional oxygen and securing improved exothermicity and incorporating lime to flux silica formed during the exothermic reactions.

Suitable oxidation may be effected by roasting the altered mineral concentrates at temperatures ranging from about 700° C. to 1000° C. in the presence of lime and a little soda ash. The time of roasting may vary considerably, depending, among other things, on the temperature employed, the degree of oxidation desired and the type of equipment employed. Oxidation may be carried out in any suitable apparatus. Rotary kiln and reverberatory furnace (with rabbling) treatments produce satisfactory oxidation. Lime may be employed in any suitable amount, but I prefer amounts not exceeding those which are capable of entering into chemical combination with the oxides of the oxidized material, as free lime tends to cause absorption of moisture and carbon dioxide which hinder furnace operations in which the oxidized material may be employed. The oxidized material is capable of combining chemically with all lime required to flux silicon necessary for reduction of the reducible oxides of the material.

Oxidation converts ferrous oxide and chromic oxide to ferric oxide and chromium trioxide which latter forms chromates with lime and magnesia present in the oxidation charge. The degree and amount of oxidation accomplished can be controlled and will vary in accordance with variations in the technique of procedures in which the composite reagents are to be employed. The product of the oxidation treatment, where only partial oxidation of the chromium to chromic anhydride has been accomplished may be described as a chromite-chromate product because of the presence therein of both chromite and chromate.

The following procedures are described to illustrate the value of the altered mineral concentrate in the production of chromium steels. Details of procedure may vary widely:

Using an altered mineral concentrate produced by one of the methods of the invention described above and having the following analysis

| | Percent |
|---|---|
| $Cr_2O_3$ | 74.05 |
| FeO | 7.35 |
| $SiO_2$ | 1.10 |
| $Al_2O_3$ | 3.15 |
| MgO | 11.15 |
| CaO | 3.20 |

I first roasted, at 700° C. to 1000° C., 100 parts of the concentrate with 100 parts of calcium oxide (CaO) and a little soda ash (1 to 5%) as a catalyzer, to produce a chromite-chromate product of the following composition

| | Percent |
|---|---|
| $Cr_2O_3$ | 15.65 |
| $CrO_3$ | 20.60 |
| $Fe_2O_3$ | 3.87 |
| $SiO_2$ | .52 |
| $Al_2O_3$ | 1.49 |
| MgO | 5.28 |
| CaO | 49.00 |

A second portion of the chromite concentrate was smelted with coke and silica to produce a ferrochrome silicon of the following analysis

| | Percent |
|---|---|
| Cr | 44.8 |
| Fe | 5.2 |
| Si | 50.0 |

The roasted chromite-chromate product may be mixed with the ferrochrome silicon product in the proportions, 100 parts of roasted product to 32.44 parts of ferrochrome silicon to produce an exothermic mixture for reaction on a steel bath to produce chromium steel or for reaction separately to produce a high chromium low carbon metal. In such mixture 15% excess silicon is all that is required for effective reduction.

To make 2000 pounds of 12% chromium steel, a charge of 1726 pounds of steel scrap is melted in the usual manner in an electric furnace or open hearth furnace and the carbon reduced with iron ore or mill scale (or the chromite-chromate product may be used as preferred) to about .06%. There is then charged to the bath with or without first removing the slag as the conditions may warrant 1110 pounds of the chromate-chromite ferrochrome silicon mixture. After the reaction is over, which is rapid and smooth, the steel is tapped and finished in the usual manner. It is to be noted that in this case there is sufficient combined lime in the chromite-chromate to form a lime silicate slag with the silica ($SiO_2$) from the silicon reduction and produce a slag with a lime to silica ($CaO:SiO_2$) ratio of about 1.6 to 1. There is produced by this method about 700 pounds of slag per ton of steel. The difficultly reducible magnesium chromite spinel, by this method, is rendered easily reducible at lower temperatures.

In a second modification I may use the high chromic oxide ($Cr_2O_3$) altered mineral concentrate directly with ferrosilicon to produce chromium steel.

Thus, to produce 2000 pounds of 12% chromium steel directly, I melt down in the usual manner 1538 pounds of steel scrap and after melting and removing the carbon to about .06% with mill scale or iron ore (or the chromite-chromate product may be used if desired), I add 583 pounds of high $Cr_2O_3$ concentrates, 707 pounds of lime (CaO) and 382 pounds of 50% ferrosilicon, and continue to heat until practically all the chromic oxide ($Cr_2O_3$) is reduced by the silicon. In this case I use up to 50% excess silicon (Si) for reduction because of the high temperature required and somewhat less efficient reduction of the chromium spinel. In this type of operation, the amount of excess silicon will vary widely with conditions of operation, depending to a considerable extent on the reducible components in the slag on the metal bath and the amount of silicon it is desired to incorporate in the metal product.

After the chromic oxide ($Cr_2O_3$) has been reduced, the steel is tapped and finished in the usual manner. The slag volume per ton of steel by this method is about 1200 pounds.

In a third variation in the use of the high chromic oxide ($Cr_2O_3$) altered mineral concentrate, I first reduce a portion as above stated with carbon and silica ($SiO_2$) to produce a ferrochrome silicon of the following analysis

| | Percent |
|---|---|
| Cr | 44.8 |
| Fe | 5.2 |
| Si | 50.0 |

To make 2000 pounds of 12% chromium steel, I melt down, in an electric furnace or open hearth furnace, approximately 1660 pounds of steel scrap free of chromium and reduce the carbon to about .06% with mill scale or iron ore in the usual manner. I then add to the bath 372 pounds of high chromium oxide altered mineral concentrate, 459 pounds of lime (CaO) and 243 pounds of ferrochrome silicon. This is about 50% in excess of the silicon (Si) theoretically required, and, as in the second case above, it is used because of the high temperature required and the somewhat less efficient reduction of the high chromic oxide ($Cr_2O_3$) magnesium spinel. After the chromic oxide ($Cr_2O_3$) is reduced, the steel is tapped and finished in the usual manner. In this case, 80% recovery of chromium is obtained and the slag volume is about 785 pounds.

In carrying out the above-described procedures for producing chromium steel, about eighty percent (80%) recovery is obtained, but with careful technique up to ninety-five percent (95%) recoveries have been obtained. As a general rule more efficiency, shorter time, and lower temperatures are secured by the first method, namely, by roasting to chromite-chromate and fine grinding and intimately mixing to produce a self-propagating mixture which reacts within itself to produce molten chromium metal, than by the other methods where the reaction of silicon with chromic oxide ($Cr_2O_3$) is mainly dependent on the contact of the silicon in the metal and the chromic oxide ($Cr_2O_3$) in the slag at the contact area of the slag and metal. In the first method, the chromite-chromate product ($MgO$ $CaO$ $Cr_2O_3$ $CrO_3$) is more readily reducible and at lower temperatures than the magnesium chromite ($MgO \cdot Cr_2O_3$).

One of the advantages of the high chromic oxide ($Cr_2O_3$) spinel of the altered mineral concentrate for making chromate-chromite mixture is that sufficient lime can be added without undue dilution and chemically combined with the basic and acidic oxides in the roasting to supply sufficient lime to form a lime-silica ($CaO-SiO_2$) slag of 1.5 lime to 1 silica or better which is basic enough to give good control of phosphorus and silicon in the metal and maintain high exothermicity. The combined lime further lessens the danger of hydrogen inclusion in the resulting steel. Another important advantage of the altered mineral concentrate of the invention resides in its availability for producing low-carbon chromium steels because of its freedom from carbon. Composite reagents and smelting charges including the altered mineral concentrate as a component need only contain the carbon present in the non-carbonaceous reducing agents and other materials forming other components of the composite reagents. In the case of composite reagents, this amount of carbon can be made very low by proper selection of the non-carbonaceous reducing agents. The amount of carbon in the composite reagents need not exceed about 0.01 to 0.04 percent by weight.

The production of altered mineral concentrates in accordance with the invention is illustrated in the accompanying flow sheet.

I claim:

1. The method of recovering chromium which comprises forming a charge comprising chromium-bearing material containing ferrous chromite and having alumina and silica associated therewith and a basic compound capable of substituting for the ferrous oxide of the ferrous chromite to displace the ferrous oxide from chemical combination with the chromic oxide of the ferrous chromite and form altered or substituted chromite, heating the charge to produce a fused product containing altered or substituted chromite formed by substitution of the basic compound for ferrous oxide of the chromite of the original chromium-bearing material, and subjecting the resulting product in solid, finely divided form to a concentration treatment to separate and recover a solid, finely divided concentrate comprising an altered or substituted chromite high in chromic oxide and low in alumina.

2. The method of recovering chromium which comprises forming a charge comprising chromium-bearing material containing ferrous chromite and having alumina and silica associated therewith and a basic compound capable of substituting for the ferrous oxide of the ferrous chromite to displace the ferrous oxide from chemical combination with the chromic oxide of the ferrous chromite and form altered or substituted chromite, heating the charge to produce a fused product containing altered or substituted chromite formed by substitution of the basic compound for ferrous oxide of the chromite of the original chromium-bearing material, and subjecting the resulting product in finely divided form to a gravity concentration treatment to separate and recover an altered or substituted chromite high in chromic oxide and low in alumina from the material associated therewith in the fused charge.

3. The method of recovering chromium which comprises forming a charge comprising chromium-bearing material containing ferrous chromite and having alumina and silica associated therewith and a basic compound capable of substituting for the ferrous oxide of the ferrous chromite to displace the ferrous oxide from chemical combination with the chromic oxide of the ferrous chromite and form altered or substituted chromite, heating the charge to produce a sintered product containing altered or substituted chromite formed by substitution of the basic compound for ferrous oxide of the chromite of the original chromium-bearing material, and subjecting the resulting product in solid, finely divided form to a concentration treatment to separate and recover a solid, finely divided concentrate comprising an altered or substituted chromite high in chromic oxide and low in alumina.

4. The method of recovering chromium which comprises forming a charge comprising chromium-bearing material containing ferrous chromite and having alumina and silica associated therewith and a basic compound capable of substituting for the ferrous oxide of the ferrous chromite to displace the ferrous oxide from chemical combination with the chromic oxide of the ferrous chromite and form altered or substituted chromite, heating the charge to produce a molten product containing altered or substituted chromite formed by substitution of the basic compound for ferrous oxide of the chromite of the original chromium-bearing material, and subjecting the resulting product in solid, finely divided form to a concentration treatment to separate and recover a solid, finely divided concentrate comprising an altered or substituted chromite high in chromic oxide and low in alumina.

5. The method of recovering chromium which comprises forming a charge comprising lime and chromium-bearing material containing ferrous chromite and having magnesium oxide, alumina and silica associated therewith, heating the charge to produce a fused product containing altered or substituted chromite formed by substitution of magnesium oxide for ferrous oxide of the chromite of the original chromium-bearing material, and subjecting the resulting product in solid, finely divided form to a concentration treatment to separate and recover a solid, finely divided concentrate comprising an altered or substituted chromite high in chromic oxide and low in alumina.

6. The method of recovering chromium which comprises forming a charge comprising lime and chromium-bearing material containing ferrous chromite and having magnesium oxide, alumina and silica associated therewith, heating the charge to produce a sintered product containing altered or substituted chromite formed by substitution of magnesium oxide for ferrous oxide of the chromite of the original chromium-bearing material, and separating an altered or substituted chromite high in chromic oxide and low in alumina from the material associated therewith in the sintered charge.

7. The method of recovering chromium which comprises forming a charge comprising lime and chromium-bearing material containing ferrous chromite and having magnesium oxide, alumina and silica associated therewith, heating the charge to produce a molten product containing altered or substituted chromite formed by substitution of magnesium oxide for ferrous oxide of the chromite of the original chromium-bearing material, and subjecting the resulting product in solid, finely divided form to a concentration treatment to separate and recover a solid, finely divided concentrate comprising an altered or substituted chromite high in chromic oxide and low in alumina.

8. The method of recovering chromium which comprises forming a charge comprising lime and chromium-bearing material containing ferrous chromite and having magnesium oxide, alumina and silica associated therewith, heating the charge to produce a fused product containing altered or substituted chromite formed by substitution of magnesium oxide for ferrous oxide of the chromite of the original chromium-bearing material, the lime and silica in the charge being so proportioned and present in such quantities as to result in the production of a fused product capable of disintegrating upon cooling, and subjecting the resulting product in solid, finely divided form to a concentration treatment to separate and recover a solid, finely divided concentrate comprising an altered or substituted chromite high in chromic oxide and low in alumina.

9. The method of recovering chromium which comprises forming a charge comprising lime and chromium-bearing material containing ferrous chromite and having magnesium oxide, alumina and silica associated therewith, heating the charge to produce a sintered product containing altered or substituted chromite formed by substitution of magnesium oxide for ferrous oxide of the chromite of the original chromium-bearing material, the lime and silica in the charge being so proportioned and present in such quantities as to result in the production of a sintered product capable of disintegrating upon cooling, and separating an altered or substituted chromite high in chromic oxide and low in alumina from the material associated therewith in the sintered charge.

10. The method of recovering chromium which comprises forming a charge comprising lime and chromium-bearing material containing ferrous chromite and having magnesium oxide, alumina and silica associated therewith, heating the charge to produce a molten product containing altered or substituted chromite formed by substitution of magnesium oxide for ferrous oxide of the chromite of the original chromium-bearing material, the lime and silica in the charge being so proportioned and present in such quantities as to result in the production of a molten product capable of disintegrating upon cooling, and subjecting the resulting product in solid, finely divided form to a concentration treatment to separate and recover a solid, finely divided concentrate comprising an altered or substituted chromite high in chromic oxide and low in alumina.

11. The method of recovering chromium which comprises forming a charge consisting essentially of chromium-bearing material containing ferrous chromite and having alumina and silica associated therewith and a basic compound capable of substituting for the ferrous oxide of the ferrous chromite to displace the ferrous oxide from chemical combination with the chromic oxide of the ferrous chromite and form altered or substituted chromite, heating the charge to produce a fused product containing altered or substituted chromite formed by substitution of the basic compound for ferrous oxide of the chromite of the original chromium-bearing material, and subjecting the resulting product in solid, finely divided form to a concentration treatment to separate and recover a solid, finely divided concentrate comprising an altered or substituted chromite high in chromic oxide and low in alumina.

12. The method of recovering chromium which comprises forming a charge consisting essentially of silica, lime and chromium-bearing material containing ferrous chromite and having magnesium oxide, alumina and silica associated therewith, heating the charge to produce a fused product containing altered or substituted chromite formed by substitution of magnesium oxide for ferrous oxide of the chromite of the original chromium-bearing material, the lime and silica in the charge being so proportioned and present in such quantities as to result in the production of a fused product capable of disintegrating upon cooling, and subjecting the resulting product in solid, finely divided form to a concentration treatment to separate and recover a solid, finely divided concentrate comprising an altered or substituted chromite high in chromic oxide and low in alumina.

13. The method of recovering chromium which comprises forming a charge comprising chromium-bearing material containing ferrous chromite and having magnesium oxide, alumina and silica associated therewith, and heating the charge under the influence of a basic compound to form a self-disintegrating sintered product containing altered or substituted chromite formed by substitution of magnesium oxide for ferrous oxide of the ferrous chromite of the original chromium-bearing material.

14. The method of recovering chromium which comprises forming a charge comprising chromium-bearing material containing ferrous chromite and having alumina and silica associated therewith and a basic compound capable of substituting for the ferrous oxide of the ferrous chromite to displace the ferrous oxide from chemical combination with the chromic oxide of the ferrous chromite and form altered or substituted chromite, heating the charge to produce a fused product containing altered or substituted chromite formed by substitution of the basic compound for ferrous oxide of the chromite of the original chromium-bearing material, decomposing the resulting product with acid, and subjecting the decomposed product in solid, finely divided form to a gravity concentration treatment to separate and recover a solid, finely divided concentrate comprising an altered or substituted chromite high in chromic oxide and low in alumina.

MARVIN J. UDY.